Oct. 4, 1955　　　G. J. SWANSON ET AL　　　2,719,736
CLAMPING AND SEALING COUPLING DEVICE
Filed April 3, 1950

INVENTORS
George J. Swanson
Walter F. Hennessey, Jr.
BY
Dale A. Bauer
ATTORNEY

United States Patent Office 2,719,736
Patented Oct. 4, 1955

2,719,736
CLAMPING AND SEALING COUPLING DEVICE

George J. Swanson and Walter F. Hennessey, Jr., Sidney, N. Y., assignors to Bendix Aviation Corporation, New York, N. Y., a corporation of Delaware Application April 3, 1950, Serial No. 153,586

8 Claims. (Cl. 285—22)

The present invention relates to clamping and sealing coupling devices and more particularly to means for clamping a cable, rod or the like, such as at or adjacent a mechanical or electrical connection, in a substantially moisture-proof and mechanically secure manner.

One of the objects of the present invention is to provide novel means for circumferentially clamping a cable or other generally cylindrical part and automatically centering it within a coupling or clamping member through which the same extends.

Another object of the invention is to provide a novel device for mechanically clamping an elongated member and simultaneously forming a substantially water-tight seal around the same and an opening through which it extends into a closed space.

Another object is to provide novel clamping means which are so constructed that the same may be readily applied to an insulated cable, for example, without danger of damaging or impairing the strength or efficiency of the cable.

A further object is to provide a novel, substantially water-tight fitting around a cable or the like adjacent where the latter emerges from a mating fitting.

Still another object is to provide means which are novelly so constructed as to form a safe and substantially water-tight seal around a cable, tube or the like which passes therethrough.

Still another object is to provide novel clamping and sealing means in novel combination with a pair of mechanically connected elements and an elongated body extending into at least one of said elements.

A still further object is to provide novel clamping means which may be applied to a cable or other elongated body by means of relatively rotating parts without subjecting said cable or body to any appreciable or undesirable twisting or torsional strain.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

Figure 1:
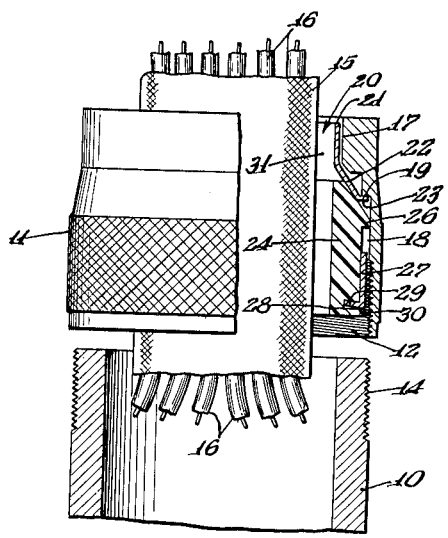
Figure 2:
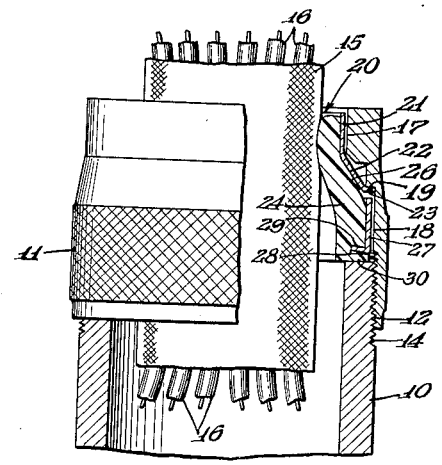
Figure 3:
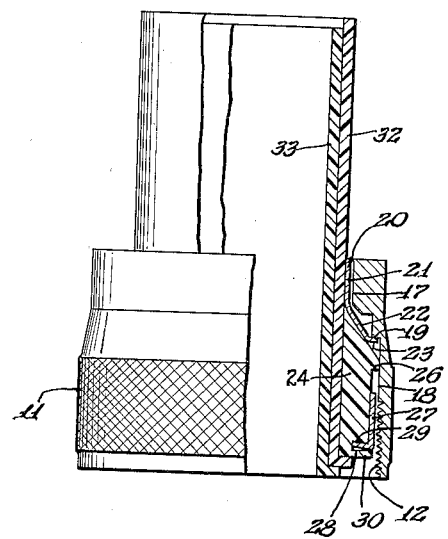

In the drawings, wherein like reference characters refer to like parts throughout the several views, Fig. 1 is a side elevation view, partly in section and with parts broken away, showing one form of the novel clamping and sealing means comprehended by the present invention in non-clamping position;

Fig. 2 is a view like Fig. 1 showing the same form of the invention operatively applied to a multiple conductor cable; and Fig. 3 is a view similar to Fig. 1 illustrating a modification.

The invention is illustrated in the accompanying drawings, by way of example, in the form of means for clamping a multiple conductor cable against detrimental longitudinal or axial movement relative to a part electrically connected therewith or relative to a conduit or the like into which the cable extends and to substantially seal the opening in the conduit or other closure around the cable against the entrance of moisture, such as water. It will be understood, of course, that the cable may be replaced by other elongated bodies, such as a rod, tube, etc., or even by a plurality of individual insulated conductors or the like. One very useful application of the invention is in combination with multiple contact plug and socket connectors, such as that disclosed in our U. S. Patent No. 2,662,219, for "Electrical Apparatus." The present invention may, for example, be employed in lieu of the self-centering clamping means 47, 48, 49 of said patent.

In the specific embodiment illustrated, the fittings with which the novel clamping means are combined are shown in the simplest possible form as a rigid conduit 10 and a tubular collar or nut 11, the latter being internally threaded at 12 to cooperate with the external threads 14 on the conduit. Other known forms of connecting means for these fittings or coupling members may be used, such as a bayonet joint. Extending through nut 11 and into conduit 10 is the elongated body or means with respect to which the invention functions as clamping means, and as shown, the same is in the form of a multiple conductor cable 15 made up of one or a plurality of conductors 16. As a further specific example, the conduit 10 might be a portion of the shell of the plug or socket assembly of a single or multiple contact electrical connector adapted for housing a suitable insert for supporting plug or socket contacts to which conductors 16 may be electrically connected. Many such structures are well known in the art and it is accordingly believed to be unnecessary to specifically illustrate and describe the same. One such structure is shown in our above-mentioned copending application wherein either member 10 or 41 may be considered as comparable to conduit 10 of the present disclosure.

The novel structure contemplated by this invention is effective to clamp or grip cable 15 within nut 11 to prevent the transmission therethrough or thereby of any strains or forces to the individual conductors 16 which might result in the severing of any connection of said conductors to other parts and to effect at the same time a suitable seal against the passage of water or other liquids into the conduit around the cable. As shown, fitting member or nut 11 has a differential bore therethrough comprising a small diameter bore 17 and a larger diameter bore 18, the latter terminating at an internal shoulder 19. An adapter 20 in the form of a ring or sleeve is loosely mounted in collar or nut 11 and removably held in place therein in a manner to hereinafter appear. Said adapter sleeve comprises a reduced cylindrical end portion 21 and a tapered or cone-shaped portion 22 that flares outwardly from said cylindrical portion and terminates in a radial end flange 23 which engages shoulder 19 to limit relative axial movement of members 11 and 20 in one direction, i. e., to limit the movement of the adapter into said nut in one direction. If desired, this function may be accomplished by causing the tapered portion 22 to engage a similarly tapered or conical shoulder within nut 11. If desired, only the inner surface or bore of portion 22 need be tapered.

Mounted in the enlarged bore 18 and projecting into the enlarged or tapered portion of adapter 20 is a compressible clamping and sealing grommet or sleeve 24 which is preferably made of a readily deformable plastic material, such as resilient natural or synthetic rubber. In its natural or unstressed condition, sleeve 24 has an inner cylindrical surface, the diameter of which is preferably at least as great and preferably somewhat greater than the outer diameter of cable 15 or other comparable part to be clamped. The external surface at the outer or upper end of sleeve 24, as viewed in the drawings, is preferably tapered and engageable with tapered bore portion 22 of adapter 20 with which it cooperates in a manner to hereinafter appear.

For the purpose of removably supporting or securing grommet or sleeve member 24 and adapter 20 in nut 11, resilient sleeve 24 may be provided with an external circumferential rib or flange 26. The diameter of the latter is somewhat greater than the inner diameter of bore 18 and hence, exerts a sufficient radial force against the inner wall of nut 11 to frictionally hold sleeve 24 and hence adapter 20 in place. This holding means will avoid accidental separation of the parts in normal usage without making it difficult to assemble or disassemble the same. Said means are desirable to facilitate handling during the application of the clamping means and to avoid separation, loss and incorrect assembly of the parts of the clamping means when the major parts of a complete assembly are disassembled for inspection, repair or the like.

In order to impart a desired amount of axial stiffness to the lower or inner end of grommet 24, to limit or prevent undue radial expansion thereof under compressive stresses and to prevent engagement of the grommet with the threads 12, said inner end of the grommet is surrounded by a rigid or non-expansible sleeve or cylinder 27 which functions as a retainer to accomplish the purposes stated. Cooperable means in the form of an annular groove 28 (in sleeve 24) which receives an internal radial flange 29 on retainer 27 are provided for securing said sleeve and retainer together for axial movement relative to nut 11 and adapter 20. The inner or lower end of resilient sleeve 24 is adapted to compressively engage the end of conduit 10 when nut 11 is applied thereto and thus form a water-tight annular seal at this joint around the open end of the conduit. It will be seen that this annular seal is effected by clamping the yieldable resilient flexible lip 30 between the end of conduit 10 and retainer flange 29. The seal is improved if radial flange 29 extends upwardly at a small angle, as illustrated in the drawings, so that there will result a line or circle of contact along which there will be relatively high specific pressure when the bend in the flange engages lip 30 and presses it against the end of conduit or fitting 10.

To render the clamping and sealing means operative with respect to cable 15, the nut 11 is screwed onto fitting or conduit 10, thereby first bringing the conduit into end-to-end engagement with the clamping and sealing sleeve 24, 30. Continued downward movement of the nut onto the conduit compresses sleeve 24 axially and causes the tapered upper end thereof to slide along and through tapered portion 22 of adapter 20 and to squeeze into the annular space 31 between cable 15 and cylindrical bore portion 21 of the adapter (Fig. 2). Since the wall thickness of the major portion of that part of sleeve 24 thus moved into space 31 is greater than the radial width of the space, the sleeve will firmly grip the cable and center it within the bores of the adapter and nut. At the same time, sealing engagements between the sleeve and cable and between the sleeve and adapter are effected, the sleeve wall being under radial compression between the cable and adapter. Inasmuch as the resilient sleeve 24 is free to move out through the end or top of adapter 20 and to expand its wall thickness within nut 11, the radial force exerted on the cable by the radially compressed portion of sleeve 24 will depend in a large degree upon the nature and flowability of the resilient material used and will be relatively constant for a given size cable and fitting independently of the extent to which nut 11 is screwed onto conduit 10. Accordingly, all danger of doing harm to the cable by applying too great a pressure thereto is substantially eliminated by the present novel construction and the selection of a suitably pliable and flowable material for sleeve 24. The seal is completed by the axially compressive end-to-end engagement of sleeve 24 and conduit 10.

It will be noted that during the application of nut 11 to conduit 10 the parts 20, 24 and 27 therein do not rotate with the nut. Said parts remain stationary and the nut has sliding metal-to-metal or other low friction engagement with flange 23 at shoulder 19. If these engaging surfaces are smooth there will be but little friction and hence, very little torque or twisting moment will be transmitted to the cable. It will be noted that rib 26 will be withdrawn from contact with nut 11 upon the initial movement of grommet 24 into adapter 20, so that the nut is thereafter free to rotate without contacting the grommet.

When cable 15 or other elongated body to be clamped is so small that sleeve 24 will not satisfactorily fill the space 31 when under suitable compression, one or more compensating or shim tubes 32 and 33 may be inserted. These tubes or cylinders are preferably made of rubber or similar compressible or yieldable material and may have a sliding fit in adapter 20 or the same may fit onto the cable itself. As a general rule, the use of the shim tubes may be and preferably is avoided by selecting a smaller size fitting and clamping device when the cable or other part to be clamped is small.

There is thus provided a unique and advantageous clamping device whereby a cable or the like may be circumferentially gripped and centered in a passage therefor without material danger of damaging the cable by inadvertent application and maintenance of excessive pressure. Additionally, said device also constitutes an adequate sealing and closure means around a cable or the like for the opening through which the cable extends in a fitting, bulkhead or the like. The parts are of simple and inexpensive construction and are adapted to be detachably retained in assembled relation in a novel manner and applied by a rotating nut or the like to a body to be clamped without subjecting said part to any detrimental twisting force.

Although only a limited number of embodiments of the invention have been illustrated in the accompanying drawings and described in the foregoing specification, it is to be expressly understood that the invention is not limited thereto. For example, the invention in its broader aspects may be adapted to use in other fields, such as in the fields of stuffing boxes and packing around rotating or reciprocating parts wherein other kinds of known materials for some of the elements may be found useful. In some applications it may be desirable to make sleeve 24 of yieldable or compressible, but non-resilient material. Additionally, other changes, such as in the specific shapes and sizes of the parts illustrated, may be made without departing from the spirit, scope and objects of the invention, as will now be apparent to those skilled in the art.

What is claimed is:

1. In apparatus of the class described, a tubular coupling member having an internally threaded end portion and an adjacent cylindrical portion, a tubular adapter in said member, a portion of the bore of said adapter being tapered and a reduced end portion of said adapter being cylindrical, and said member and adapter having cooperating means thereon for limiting axial movement of the adapter into said member, a resilient sleeve in said member engageable with the tapered bore of the adapter and extending axially into said threaded portion, and a rigid retainer slidably fitting into said cylindrical portion of the coupling member and closely surrounding the major portion of said sleeve within said threaded portion to prevent radial expansion of said portion of the sleeve and to direct said sleeve axially into the tapered portion and thence into the reduced cylindrical portion of the adapter when axial pressure is applied to said sleeve in the direction of the adapter.

2. Apparatus as defined in claim 1 wherein the retainer comprises an internal flange engaging an external groove in said sleeve.

3. Apparatus as defined in claim 2 wherein said groove is close to the end of said sleeve and said flange is at the corresponding end of said retainer.

4. In apparatus of the class described, the combination of a metallic conduit having external screw threads at one end thereof, a tubular nut threadedly engaging said conduit and having a reduced bore portion, an enlarged bore portion and an internal shoulder therein, insulated conductor means extending through said nut into said conduit, a tubular metallic adapter comprising an external flange engaging the internal shoulder in said nut, a cylindrical end portion extending into said reduced bore portion and a tapered central portion tapered inwardly from said flange and joining said flange and end portion, a sleeve of resilient material within said nut and adapter and having the circumferential wall at one end thereof in contact with the insulated conductor means and under radial compression between said means and said cylindrical end portion of the adapter, said sleeve when in its unstressed condition having an internal diameter at least as great as the diameter of said means and a tapered external surface at said one end tapered in the same direction as and cooperable with the tapered central portion of said adapter during assembly, and a rigid retaining ring comprising a cylindrical portion closely surrounding said sleeve and slidable within the enlarged bore portion of the nut and internal flange means extending into the wall of said sleeve, the end portion of said sleeve adjacent said ring being under axial compression and in end-to-end engagement with said conduit.

5. Apparatus as defined in claim 4 wherein the resilient sleeve has integral external resilient projecting means intermediate the ends thereof, said projecting means being adapted to yieldably and frictionally engage the enlarged bore of said nut when the sleeve is in normal and substantially unstressed condition to hold the sleeve and adapter within the nut and being adapted to move into said adapter when said nut is threaded onto said conduit.

6. In a cable clamping device, a tubular nut having a reduced bore portion and an enlarged bore portion therein and an internal shoulder, an end portion of said enlarged bore portion being internally threaded, a rigid tubular adapter loosely mounted in said nut for rotation relative thereto, said adapter comprising a cylindrical end portion in the reduced bore portion of the nut, an external flange engageable with said internal shoulder and a tapering central portion tapered inwardly from the flange and joining the flange and cylindrical end portion, a unitary sleeve of molded resilient material in said nut and extending axially into the threaded end portion of the enlarged bore of said nut, said sleeve having an externally tapered end portion tapered in the same direction as and cooperable with the tapering portion of said adapter, and a rigid ring slidably fitting into said enlarged bore portion of the nut and closely surrounding the major portion of said sleeve within said threaded end portion of the enlarged bore portion of said nut to prevent radial expansion of said last-mentioned portion of the sleeve and to direct said sleeve axially into the tapering central portion and thence into the cylindrical end portion of the adapter when axial pressure is applied to said sleeve in the direction of the adapter, said ring and sleeve having cooperating means thereon for resisting relative axial bodily movement thereof.

7. A device as defined in claim 6 comprising radially projecting resilient means integral with said sleeve between said ring and adapter and extendable into frictional engagement with the enlarged bore portion of said nut to yieldably maintain said sleeve and adapter in the nut.

8. Apparatus as defined in claim 1 wherein said retainer includes means cooperable with said sleeve to connect the retainer and sleeve for axial movement together.

References Cited in the file of this patent

UNITED STATES PATENTS

| Number | Name | Date |
|---|---|---|
| 402,007 | Dewees | Apr. 23, 1889 |
| 1,063,827 | Mullin | June 3, 1913 |
| 1,154,540 | Oster et al. | Sept. 21, 1915 |
| 1,729,949 | Lofgren | Oct. 1, 1929 |
| 1,762,721 | Klinger | June 10, 1930 |
| 2,170,393 | Tornblom | Aug. 22, 1939 |
| 2,247,032 | Norton | June 24, 1941 |
| 2,250,517 | Zolleis | July 29, 1941 |
| 2,397,735 | Grieb | Apr. 2, 1946 |
| 2,402,050 | Ingalls | June 11, 1946 |
| 2,503,169 | Phillips | Apr. 4, 1950 |
| 2,519,436 | Cadman | Aug. 22, 1950 |
| 2,542,583 | Shea, Jr. | Feb. 20, 1951 |
| 2,562,359 | Iredell | July 31, 1951 |

FOREIGN PATENTS

| Number | Country | Date |
|---|---|---|
| 291,734 | Germany | May 5, 1916 |
| 98,001 | Sweden | Feb. 6, 1940 |
| 576,863 | Great Britain | Apr. 24, 1946 |